No. 884,511. PATENTED APR. 14, 1908.
W. O. LUM.
SELF STARTER.
APPLICATION FILED AUG. 6, 1906.
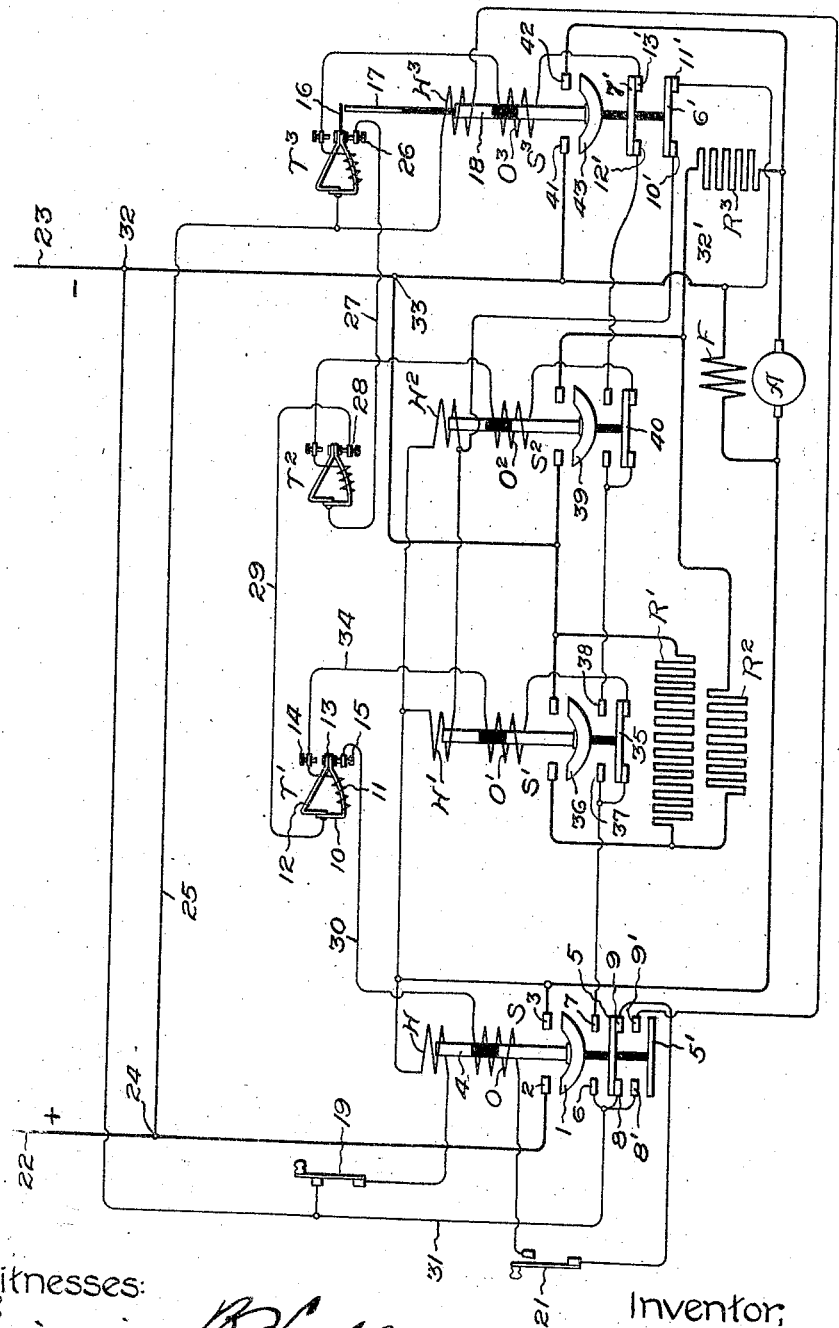
Witnesses:
Inventor:
Walter O. Lum,
by Albert Davis
Att'y.

UNITED STATES PATENT OFFICE.

WALTER O. LUM, OF SCHENECTADY, NEW YORK, ASSIGNOR TO GENERAL ELECTRIC COMPANY, A CORPORATION OF NEW YORK.

SELF-STARTER.

No. 884,511.

Specification of Letters Patent.

Patented April 14, 1908.

Application filed August 6, 1906. Serial No. 329,321.

*To all whom it may concern:*

Be it known that I, WALTER O. LUM, a citizen of the United States, residing at Schenectady, county of Schenectady, State of New York, have invented certain new and useful Improvements in Self-Starters, of which the following is a specification.

This invention relates to devices for controlling electric circuits and has for its object the provision of a device of this character whereby the electric circuit may be automatically controlled in a very reliable, safe and efficient manner by the simple closing of a control circuit.

My invention relates more specifically to devices for starting electric motors.

As is well-known, it is the common practice in the starting of electric motors to include a sufficient resistance in series with the motor armature to prevent a dangerous rush of current and then gradually cut out the starting resistance. Devices of this kind are usually hand-operated, although automatic devices have been devised for accomplishing this result. In the use of automatic starters some means must usually be provided for obtaining a time element between the successive operations which cut out the resistance. Various methods for accomplishing this result have been devised, such as the use of dashpots and the like, all of which are more or less unsatisfactory.

In carrying out my invention, I make use of a thermostatic device for controlling the successive operations, the thermostatic device being arranged so that it will come up to a sufficient temperature to cause the short-circuiting switch to operate in a predetermined time.

My invention comprises, therefore, a series of switches arranged to successively short circuit sections of starting resistance, these switches being actuated by solenoids or other electromagnetic means, each solenoid having preferably two windings, one for holding the switch in a closed position after it is once operated, and the other acting in conjunction with the holding coil to operate the switch. After the switch is once operated, the operating coil is cut out of circuit, as much less power is required to hold the switch closed than to operate the same. In series with the operating coil, I place a thermostatic device, comprising a high resistance coil adapted to heat a thermostatic couple having a contact which is adapted to move between a pair of terminals. When the current is first switched on to the solenoid, the operating coil is in series with the thermostatic coil, which latter being of high resistance, reduces the current so that it is not sufficient to operate the switch. The high resistance coil thereupon rises in temperature until the thermostatic arm moves sufficiently to close a contact which short-circuits the high resistance or thermostatic coil. The actuating coil will thereupon actuate the switch, which, in addition to closing a circuit in the main line, opens the circuit of the operating coil, leaving only the holding coil in circuit. At the same time the control circuit is closed through the next succeeding thermostat and operating coil. I also provide means whereby, when the last of the series of switches is actuated, the intermediate switches are deënergized, so that only the first and last switches of the series will be consuming current to hold them closed when the motor is running with the starting resistance short circuited. By opening the switch in series with the holding coils of the first and last switches the motor may be quickly stopped.

In the accompanying drawing I have illustrated in a somewhat diagrammatic form one embodiment of my invention. It should be understood, however, that this arrangement is merely illustrative and that many changes and modifications therein will suggest themselves to those skilled in the art without departing from the spirit of my invention as set forth in the annexed claims.

Referring to the drawing, A represents a motor armature and F the field thereof, while $R^1$, and $R^2$ and $R^3$ represent resistances which are in series with the motor armature at starting. In order to automatically cut out these resistances, I provide a series of switches $S$, $S^1$, $S^2$, and $S^3$, each having a holding coil and an operating coil. In the device, as illustrated in the drawing, four of these switches are shown, although of course more or less may be provided, as desired. The first of the switches S is for closing the armature circuit, and for this purpose is provided with a bridging contactor 1, arranged to bridge the contacts 2 and 3 when operated by the core 4 extending within the operating coil O and holding coil H. Another bridging contactor 5 is connected with the contactor 1, but insulated therefrom, and is adapted to bridge the contacts 6 and 7, when in its upward or energized position, and 8 and 9, when in its lower or deënergized position, while a similar contactor 5' is adapted when raised to bridge contacts 8' and 9'. Switches $S^1$, $S^2$, and $S^3$ are similarly constructed with the exception of the contactor 5' and contacts 8' and 9', each being provided with an operating coil, $O^1$, $O^2$ and $O^3$ respectively, and holding coils $H^1$, $H^2$ and $H^3$. Switch $S^3$ is similar to $S^1$ having two additional contactors 6' and 7' coöperating with contacts 10', 11', 12' and 13' respectively. The switch $S^1$, when operated, short-circuits the resistance $R^1$; the switch $S^2$ short-circuits resistances $R^1$ and $R^2$; while switch $S^3$ short-circuits resistances $R^1$, $R^2$ and $R^3$, placing the motor armature directly across the line. In series with each of the operating coils $O^1$, $O^2$ and $O^3$ are thermostats $T^1$, $T^2$ and $T^3$, respectively. These thermostats may be of any desired or well-known construction. In the drawing I have, however, shown a form which I have found to be suitable and which consists of a pair of bent rods of different materials. Various materials may be used for this purpose, but I have found that iron and aluminium form a satisfactory combination. Around the aluminium rod 10 is wound a high resistance heating coil 11, which coil is in series with the operating coil $O^1$, one end of the coil being in contact with the bar itself. The aluminium bar 10 and the iron bar 12 are joined together so as to form a contactor 13, adapted to move between the terminals 14 and 15. The arrangement is such that when no current is passing through the heating coil the contactor 13 is in engagement with the terminal 15, while, when the coil 11 is heated the contactor 13 moves over and closes the circuit at terminal 14. Thermostat $T^2$ is similarly arranged, while thermostat $T^3$ has the additional feature of a projecting insulating rod 16 adapted to be engaged by a projection 17 on the core 18 of switch $S^3$. This arrangement is for the purpose of holding the thermostat $T^3$ in a position short-circuiting the thermostat coil when once it has been moved, as hereinafter described. The holding coils H and $H^3$ of the first and last switches, respectively, are connected in parallel across the line, the former having a switch 19 in series therewith, and connected from contact 3 on the positive side of the line to the negative side 32, while the latter is connected from the positive main at 24 through contactor 5' and back to line at 32. The holding coils $H^1$ and $H^2$ are likewise connected in parallel across the line, from contact 3 to negative main at 32', but in series with the contactor 6' of the last switch, and a normally open operating switch 21 is arranged for closing the circuits through the thermostats and the first operating coil.

The operation of my device and the arrangement of circuits is as follows: 22 and 23 represent, respectively, the positive and negative mains of a supply circuit. When operating switch 21 is closed, the control circuit will be completed as follows: from main 22 to 24, through wire 25, to thermostat $T^3$, thence to terminal 26, wire 27, terminal 28, wire 29, terminal 15, wire 30, operating coil O, switch 21, contactor 5, and wire 31, back to line at 32. The core 4 will now be lifted, bridging the contacts 2 and 3 to close the armature circuit through resistances $R^1$ $R^2$ and $R^3$, coming back on to the line at 33, and bridging contacts 8' and 9' so as to energize holding coil H. The contactor 5 likewise breaks the circuit between contacts 8 and 9, which deënergizes the operating coil O and at the same time bridges contacts 6 and 7. The bridging of contacts 2 and 3 likewise energizes holding coils H, $H^1$ and $H^2$. The holding coil H holds the core 4 in its raised position, and the bridging of the contacts 6 and 7 completes the circuit through the coil 11 of the thermostat $T^1$, and through coil $O^1$. The control circuit, being broken between the contacts 8 and 9, can no longer go through conductor 30, and hence will pass from wire 29, through coil 11, to terminal 14, thence through wire 34, operating coil $O^1$, across contactor 35, thence across contacts 6 and 7, and back by wire 31 to line at 32. The operating coil $O^1$ is now energized, but not sufficiently to lift its core, since it has in series with it the high resistance winding 11. This coil 11 now heats and in a predetermined time interval causes the contactor 13 to shift from terminal 15 to terminal 14, thereby cutting out the high resistance coil 10 and causing the operating coil $O^1$ to lift its core. Contactor 36 is thereupon lifted, short-circuiting the resistance $R^1$, and contactor 35 is likewise lifted so as to bridge contacts 37 and 38 to complete the circuit through the operating coil $O^2$ and the thermostat of the next succeeding switch $S^2$. The operation just described is repeated in connection with the switch $S^2$ and contactor 39 is lifted, which short-circuits resistances $R^1$ and $R^2$ at the same time contactor 40 is lifted to close the circuit through operating coil $O^3$ and the heating coil of thermostat $T^3$. As described in connection with switches $S^1$ and $S^2$, core 18 of switch $S^3$ is lifted, bridging contacts 41 and 42 with contactor 43, thereby short-circuiting resistances $R^1$, and $R^2$ and $R^3$ and placing the motor armature directly across the line, with contactors 1 and 43 in series. Core 18, being raised, holds the arm 16 of thermostat $T^3$ in its upper position, thereby breaking the circuits of the operating coils $O^1$ and $O^2$ and of the thermostats $T^1$ and $T^2$ at the terminal 26. The opening of the thermostatic circuit as 26 prevents the energizing of the coils $O^3$ and $O^2$ when the cores of switches $S^1$ and $S^2$ are dropped and the circuit of the coil $O^3$ is opened at contacts 12' and 13'. The circuit of the two holding coils $H^1$ and $H^2$ is broken at contacts 10' and 11' when the switch $S^3$ is operated, thus allowing switches $S^1$ and $S^2$ to open. It will thus be seen that the armature is placed directly across the line with only the two switches S and $S^3$ in circuit. By opening the switch 19 the circuit of the holding coil H is opened, thereby opening the armature circuit and deënergizing coil $H^3$. Thus, the mere closing of a single switch sets the motor starting switches in operation to successively cut out the resistance, and the opening of a switch which is normally closed will stop the motor and return the parts to the original position.

What I claim as new, and desire to secure by Letters Patent of the United States, is,—

1. An automatic circuit controller, comprising a plurality of switches and thermostatic means for successively controlling the same.

2. An automatic circuit controller, comprising a plurality of electro-magnetic switches and thermostatic means for successively controlling the same.

3. An automatic circuit controller, comprising a plurality of electro-magnetic switches and a plurality of thermostatic devices for successively controlling said switches.

4. An automatic circuit controller, comprising a plurality of electro-magnetic switches and thermostatic devices in series with the magnet coils of said switches for successively controlling the same.

5. An automatic circuit controller, comprising a plurality of electro-magnetic switches each having an operating coil and a holding coil, and thermostatic devices in circuit with the operating coils for successively controlling said switches.

6. An automatic circuit controller, comprising a plurality of electro-magnetic switches each having an operating coil and a holding coil, and thermostatic devices in series with the operating coils for successively controlling said switches.

7. An automatic circuit controller, comprising a plurality of electro-magnetic switches each having an operating coil and a holding coil, and thermostatic devices in series with said controlling coils for effecting the operation of the switches.

8. An automatic circuit controller, comprising a plurality of switches and thermostatic means controlled by one of said switches for effecting the operation of the other.

9. An automatic circuit controller, comprising a plurality of switches each having an operating coil and a holding coil, and a thermostatic device in series with the operating coil of one of said switches for controlling the said switch.

10. An automatic circuit controller, comprising a plurality of switches each having an operating coil and a holding coil, and a thermostatic device in series with the operating coil of one of said switches and controlled by the other for effecting the operation of the former.

11. An automatic circuit controller, comprising a plurality of switches, electro-magnetic devices for actuating the same, thermostatic means for successively controlling the actuating devices, and means controlled by the last of the series of switches for deënergizing others of the series.

12. An automatic circuit controller, comprising a plurality of switches, electro-magnetic devices for actuating the same each having an operating coil and a holding coil, thermostatic means for successively controlling the operating coils, and means whereby the actuation of one of said switches deënergizes its operating coil and energizes the operating coil of the next succeeding switch.

13. An automatic circuit controller, comprising a plurality of switches, electro-magnetic devices for actuating the same, thermostatic means for successively controlling said devices, and means whereby the actuation of one of said switches deënergizes its controlling device and energizes the device of the next succeeding switch.

14. An automatic circuit controller, comprising a plurality of electro-magnetic switches each having an operating coil and a thermostatic device in series therewith, said device comprising a high resistance winding and means controlled by the temperature of said winding for short-circuiting the same to actuate the switch.

15. An automatic circuit controller, comprising a plurality of switches, electro-magnetic devices for actuating the same, a thermostat in series with each of said devices comprising a high resistance coil, means controlled by the temperature of said coil for short-circuiting the same, and means controlled by one of said switches for controlling the thermostatic device of the next succeeding switch.

16. The combination with an electric motor, of a plurality of resistances in circuit therewith, thermostatically-controlled switches for successively short-circuiting the same, and means controlled by one of said switches for effecting the operation of the next succeeding switch.

17. The combination with an electric motor, of a plurality of resistances in circuit therewith, thermostatically-controlled switches for successively short-circuiting the same, and means controlled by one of said switches for deënergizing other of said switches.

18. The combination with an electric motor, of a plurality of resistances in circuit therewith, thermostatically-controlled switches for successively short-circuiting the same, means controlled by one of said switches for effecting the operation of the next succeeding switch, and means whereby the operation of the last of the series of switches deënergizes intermediate switches.

In witness whereof I hereunto set my hand this 4th day of August, 1906.

WALTER O. LUM.

Witnesses:
 BENJAMIN B. HULL,
 GRACE M. HANIGAN.